(12) United States Patent
Garcia

(10) Patent No.: US 7,178,033 B1
(45) Date of Patent: Feb. 13, 2007

(54) METHOD AND APPARATUS FOR SECURING DIGITAL ASSETS

(75) Inventor: Denis Jacques Paul Garcia, Palo Alto, CA (US)

(73) Assignee: PSS Systems, Inc., Mountain View, CA (US)

( * ) Notice: Subject to any disclaimer, the term of this patent is extended or adjusted under 35 U.S.C. 154(b) by 753 days.

(21) Appl. No.: 10/159,537

(22) Filed: May 31, 2002

Related U.S. Application Data

(63) Continuation-in-part of application No. 10/074,804, filed on Feb. 12, 2002.

(60) Provisional application No. 60/339,634, filed on Dec. 12, 2001.

(51) Int. Cl.
  *H04L 9/14* (2006.01)
  *H04L 15/06* (2006.01)
  *H04L 9/18* (2006.01)

(52) U.S. Cl. ...................... 713/184; 713/165; 713/166; 713/167

(58) Field of Classification Search ...................... None
  See application file for complete search history.

(56) References Cited

U.S. PATENT DOCUMENTS

| | | | | |
|---|---|---|---|---|
| 4,203,166 A | * | 5/1980 | Ehrsam et al. | 380/45 |
| 5,557,765 A | * | 9/1996 | Lipner et al. | 380/286 |
| 5,708,709 A | | 1/1998 | Rose | 380/4 |
| 5,870,468 A | * | 2/1999 | Harrison | 713/165 |
| 5,870,477 A | | 2/1999 | Sasaki et al. | 380/25 |

FOREIGN PATENT DOCUMENTS

| | | |
|---|---|---|
| EP | 0950941 A2 | 10/1999 |
| EP | 0950941 A3 | 10/1999 |
| EP | 1154348 | 11/2001 |
| GB | 2328047 | 2/1999 |
| WO | WO 0163387 A2 | 8/2001 |
| WO | WO 0163387 A3 | 8/2001 |
| WO | WO 0178285 | 10/2001 |

* cited by examiner

*Primary Examiner*—Gilberto Barrón, Jr.
*Assistant Examiner*—Venkat Perungavoor
(74) *Attorney, Agent, or Firm*—Carr & Ferrell LLP

(57) ABSTRACT

Digital assets are in a secured form that only those with granted access rights can access. Even with the proper access privilege, when a secured file is classified, at least a security clearance key is needed to ensure those who have the right security clearance can ultimately access the contents in the classified secured file. According to one embodiment, a secured file or secured document includes two parts: a header, and an encrypted data portion. The header includes security information that points to or includes access rules, a protection key and a file key. The access rules facilitate restrictive access to the encrypted data portion and essentially determine who the secured document can be accessed. The file key is used to encrypt/decrypt the encrypted data portion and protected by the protection key. If the contents in the secured file are classified, the file key is jointly protected by the protection key as well as a security clearance key associated with a user attempting to access the secured file.

23 Claims, 10 Drawing Sheets

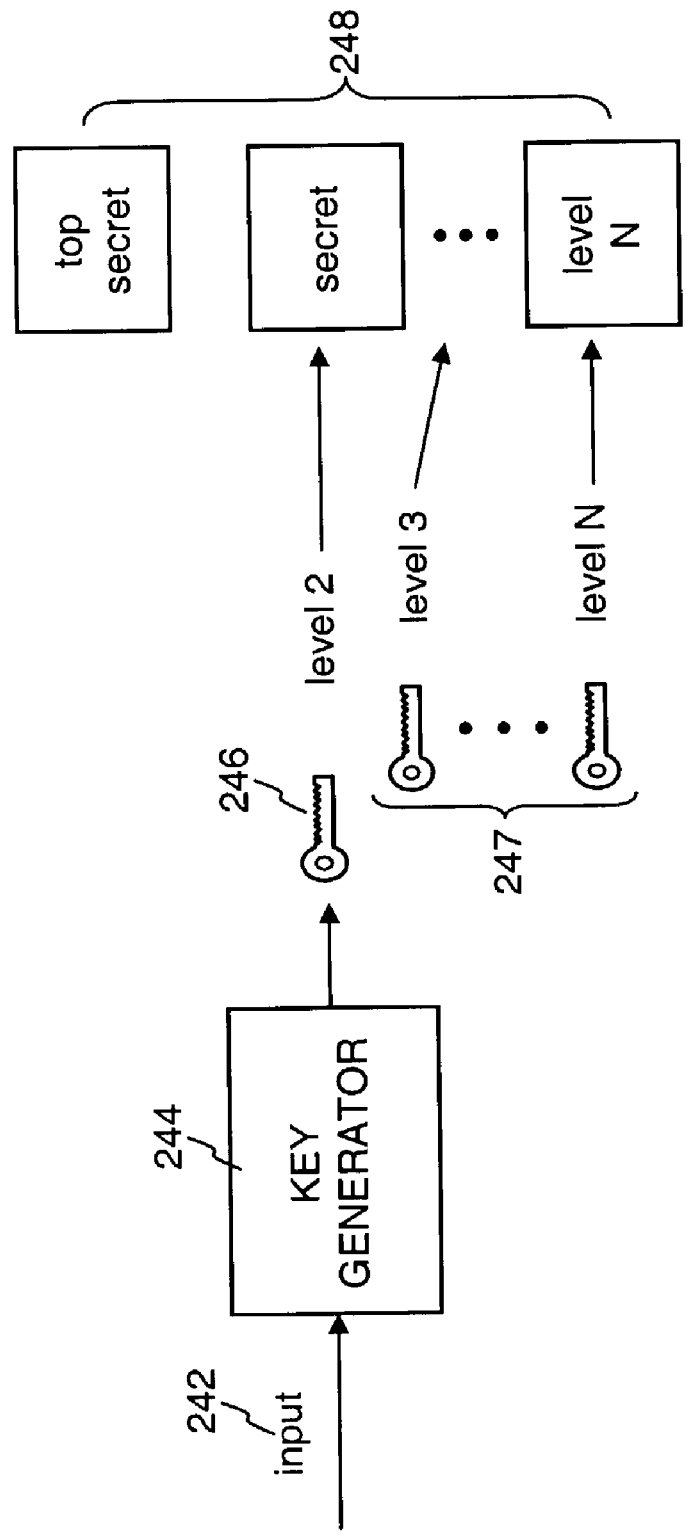

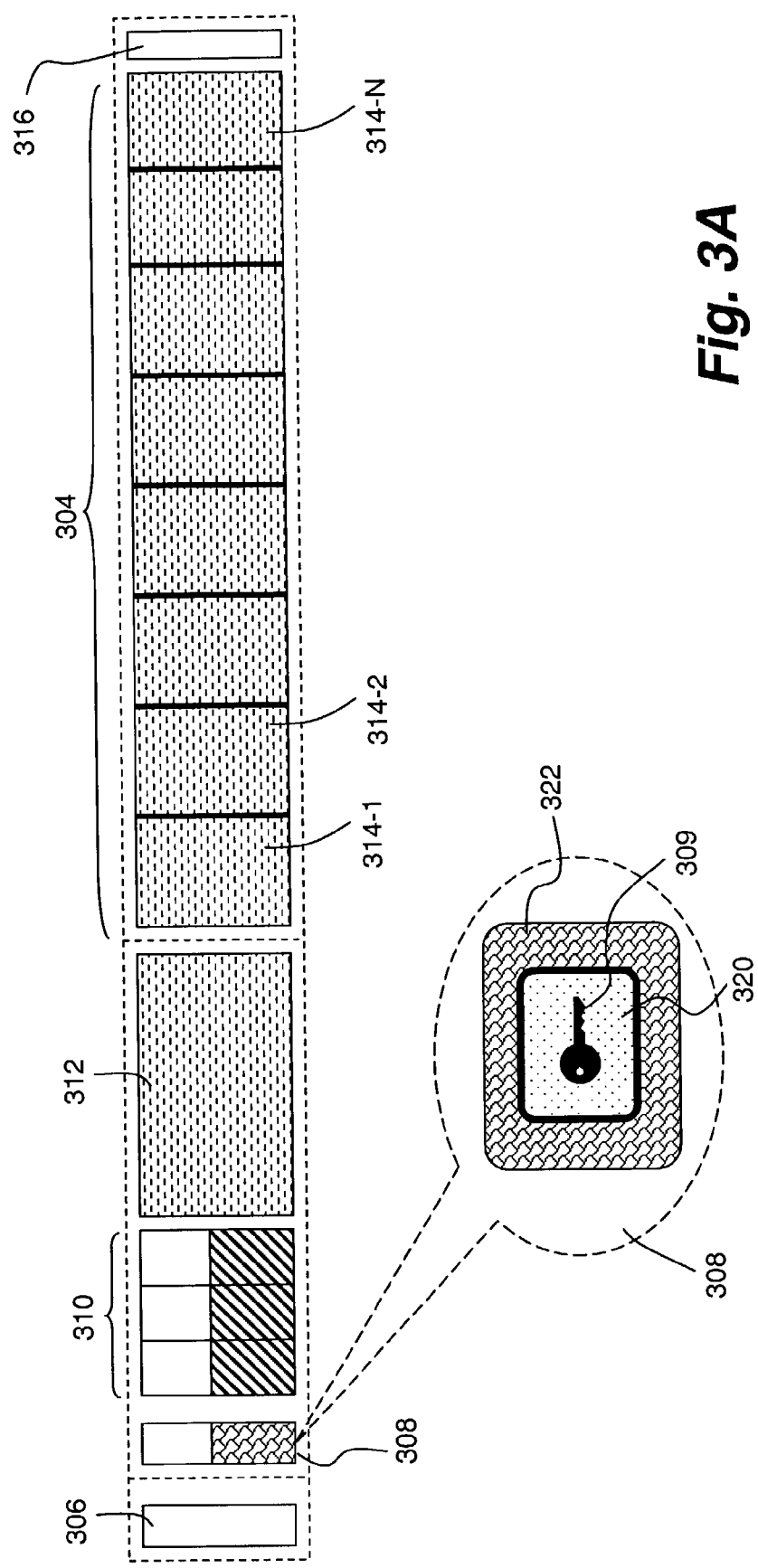

*Header (Version 1)*
```
<header version="1.0" document_uuid="...">
  <key_block_list version="1.0">
    <key_block version="1.0" group_uuid="...">
      <key_block version="1.0" group_uuid="...">
        <document_encryption_key key_pair_uuid="...">
        ... (Encrypted protection key)
        </document_encryption_key_key>     340
      </key_block>
      ... (more blocks if necessary)
  </key_block_list>
  <document_crypto_info version="...">
    <document_crypto version="1.0">
      <enc_doc_key>... (Encrypted document-encryption-key)
      </enc_doc_key>
      <enc_doc_level> ... (String like "Secret" or "Top Secret" or "None")
      </enc_doc_level>
      <encryption_algorithm name="..." key_size="..." block_size="..." />
      <ses_block_size>... (size of encryption size)
      </ses_block_size>
    </document_crypto>
  </document_crypto_info>
  <enc_document_information>
    <document_information version="1.0">
      <creation creator_uuid="..." date="..." />
      <last_modification modifier_uuid="..." date="..." />
      <rule_set>... (details omitted)
      </rule_set>
    </document_information>
  </enc_document_information>
</header>
<header_MAC version="...">... (See Header MAC Information)
</header_MAC>
```

354, 356, 358, 352, 344, 346, 348, 342, 360

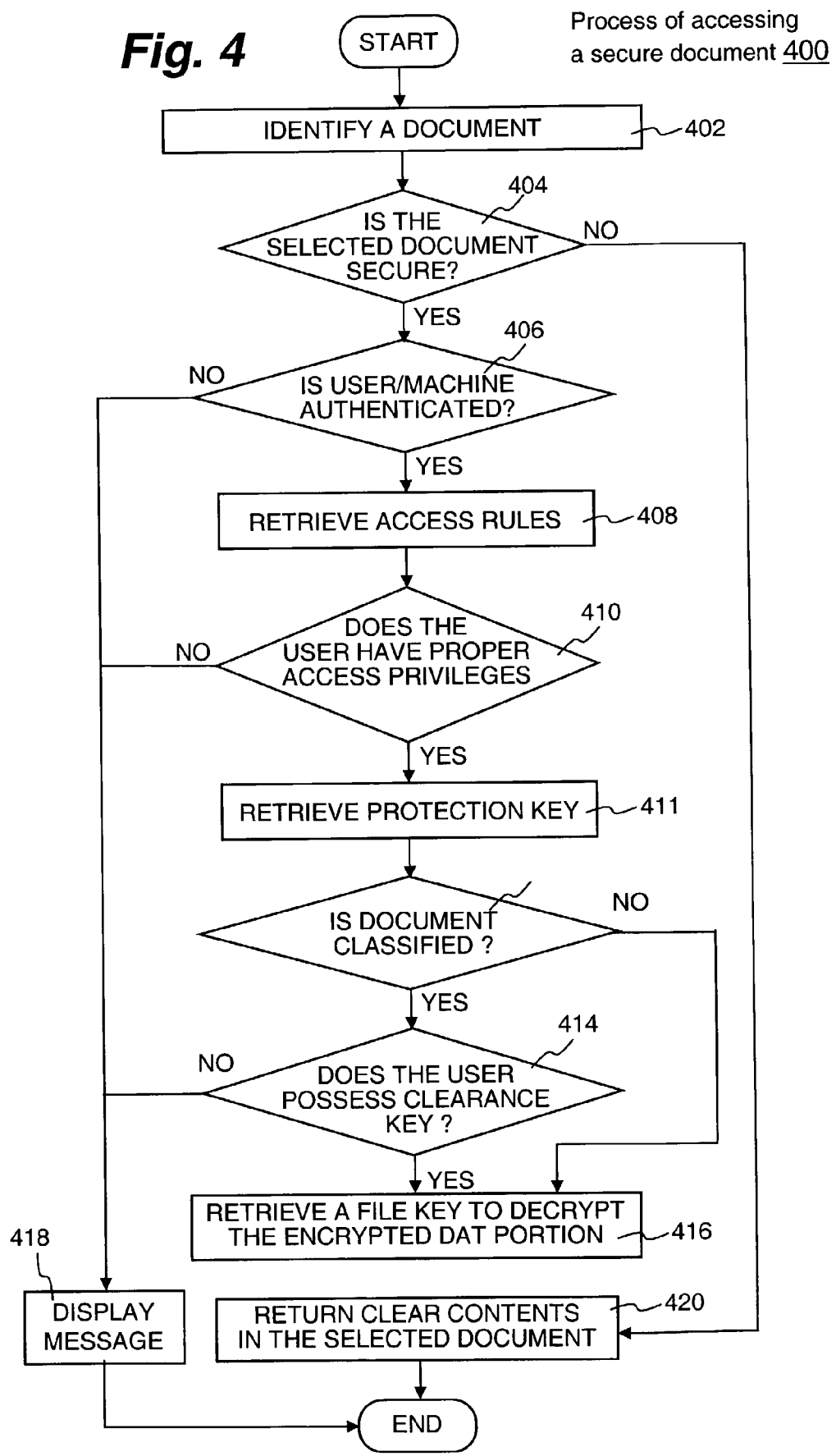

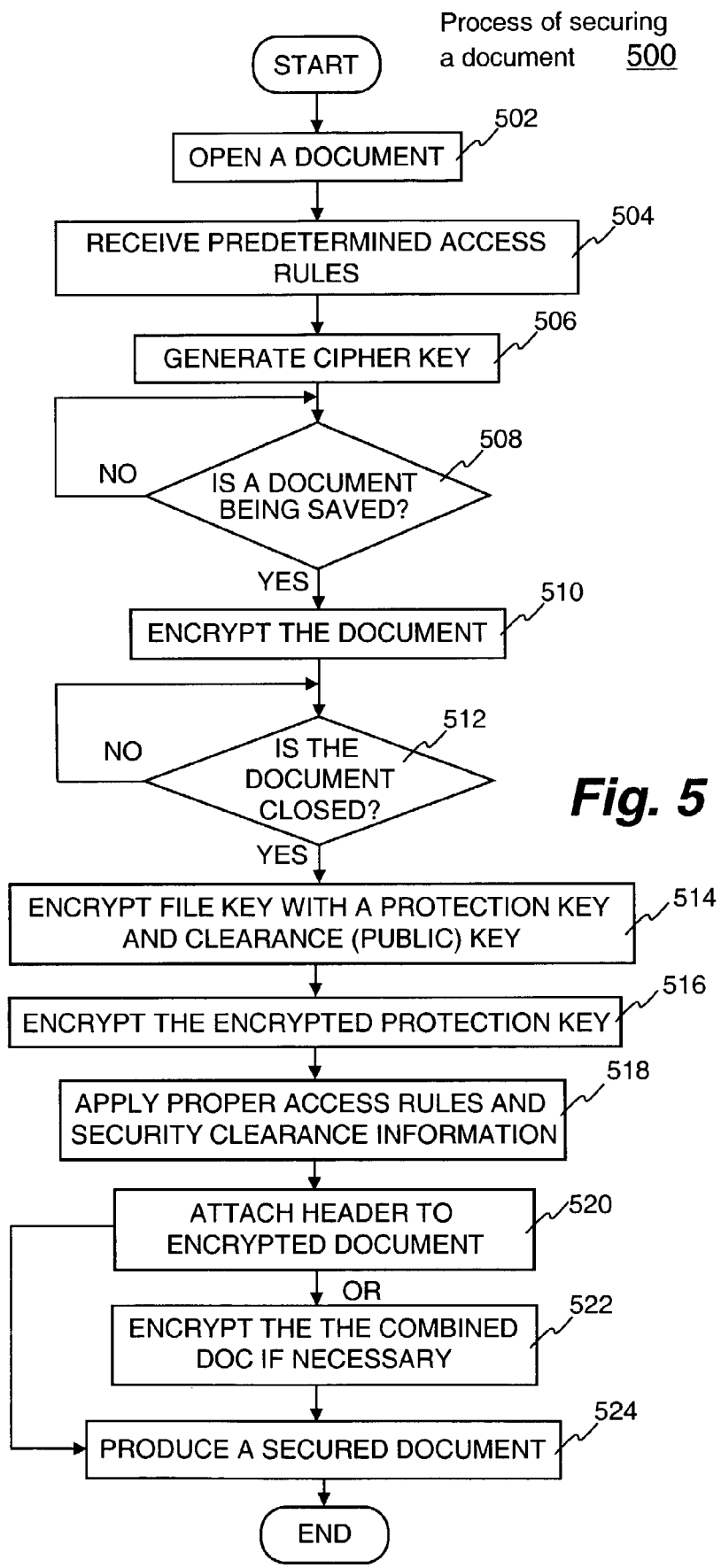

METHOD AND APPARATUS FOR SECURING DIGITAL ASSETS

CROSS-REFERENCE TO RELATED APPLICATION

This application is a continuation-in-part of U.S. patent application Ser. No. 10/074,804, filed Feb. 12, 2002, and entitled "Secured Data Format for Access Control," which is hereby incorporated by reference for all purposes. This application also claims the benefits of U.S. Provisional Application No. 60/339,634, filed Dec. 12, 2001, and entitled "PERVASIVE SECURITY SYSTEMS," which is hereby incorporated by reference for all purposes. This application is also related to U.S. patent application Ser. No. 10/127,109 and entitled "Evaluation of Access Rights to Secured Digital Assets", which is hereby incorporated by reference.

BACKGROUND OF THE INVENTION

1. Field of the Invention

The present invention relates to the area of protecting data in an enterprise environment, and more particularly, relates to a method and apparatus for securing digital assets (e.g. electronic data).

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is a widely open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an insecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remains available and vulnerable to improper access and usage by unauthorized users within or outside a supposedly protected perimeter.

A governmental report from General Accounting Office (GAO) details "significant and pervasive computer security weaknesses at seven organizations within the U.S. Department of Commerce, the widespread computer security weaknesses throughout the organizations have seriously jeopardized the integrity of some of the agency's most sensitive systems." Further it states: "Using readily available software and common techniques, we demonstrated the ability to penetrate sensitive Commerce systems from both inside Commerce and remotely, such as through the Internet," and "Individuals, both within and outside Commerce, could gain unauthorized access to these systems and read, copy, modify, and delete sensitive economic, financial, personnel, and confidential business data . . . " The report further concludes "[i]ntruders could disrupt the operations of systems that are critical to the mission of the department."

In fact, many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Therefore, there is a need to provide more effective ways to secure and protect digital assets at all times.

SUMMARY OF INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to processes, systems, architectures and software products for providing pervasive security to digital assets at all times and is particularly suitable in an inter/intra enterprise environment. In general, pervasive security means that digital assets are secured at all times and can only be accessed by authenticated users with appropriate access rights or privileges, and proper security clearance in some cases, wherein the digital assets may include, but not be limited to, various types of documents, multimedia files, data, executable code, images and texts. According to one aspect of the present invention, the digital assets are in a secured form that only those with granted access rights can access. Even with the proper access privilege, when a secured file is classified, at least a security clearance key is needed to ensure those who have the right security clearance can ultimately access the contents in the classified secured file.

In another aspect of the present invention, the format of the secured file is so designed that the security information stays with the file being secured at all times or pointed to by a pointer in the file. According to one embodiment, a secured file or secured document includes two parts: an attachment, referred to as a header, and an encrypted document or data portion. The header includes security information that points to or includes access rules, a protection key and a file key. The access rules facilitate restrictive access to the encrypted data portion and essentially determine who/how and/or when/where the secured document can be accessed. The file key is used to encrypt/decrypt the encrypted data portion and protected by the protection key. If the contents in the secured file are classified, the file key is jointly protected by the protection key as well as a security clearance key associated with a user attempting to access the secured file. As a result, only those who have the proper access privileges are permitted to obtain the protection key, jointly with the security clearance key, to retrieve the file key to encrypt the encrypted data portion.

In still another aspect of the present invention, the security clearance key is generated and assigned in accordance with a user's security access level. A security clearance key may range from most classified to non-classified. If a user has the need to access a secured file classified with a certain security or confidential level, a corresponding security clearance key with that security level is assigned therefor. In one embodiment, a security clearance key with a security level is so configured that the key can be used to access secured files classified at or lower than the security level. As a result, a user needs to have only one security clearance key. In still another aspect of the present invention, multiple auxiliary keys are provided when a corresponding security clearance key is being requested. The security clearance key is the one being requested, generated in accordance with the determined security level and can be used to facilitate the access to a secured file classified at a corresponding security or confidentiality level. The auxiliary security clearance keys are those keys generated to facilitate access to secured files classified respectively less than the corresponding security or confidentiality level. Depending on implementation, the security clearance key(s) may be further protected by means of secondary authentication, such as biometric information verification or a second password, to increase security level of the security clearance key(s).

Depending on implementation and application, the present invention may be implemented or employed in a client machine and a server machine. Typically, if a user's access privilege (i.e., access rights) to a secured file is locally determined in a client machine, the present invention may be implemented as an executable module configured to operate locally, preferably, in an operating system running in the client machine. If a user's access right to a secured file is remotely determined in a server machine, the present invention may be implemented as an executable module configured to operate in the server machine as well as in the client machine.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2D shows a diagram of generating a clearance key according to another embodiment of the present invention;

FIG. 3A illustrates an exemplary structure of a secured file including a header and an encrypted data portion;

FIG. 3B shows an exemplary header structure of a secured file according to one embodiment of the present invention;

FIG. 4 shows a flowchart of process for accessing a secured document according to one embodiment of the present invention and may be understood in conjunction with FIG. 3A and FIG. 3B;

FIG. 5 shows a flowchart of a process for securing a file or document being created according to one embodiment of the present invention.

DETAILED DESCRIPTION OF THE PREFERRED EMBODIMENTS

Figure 1:
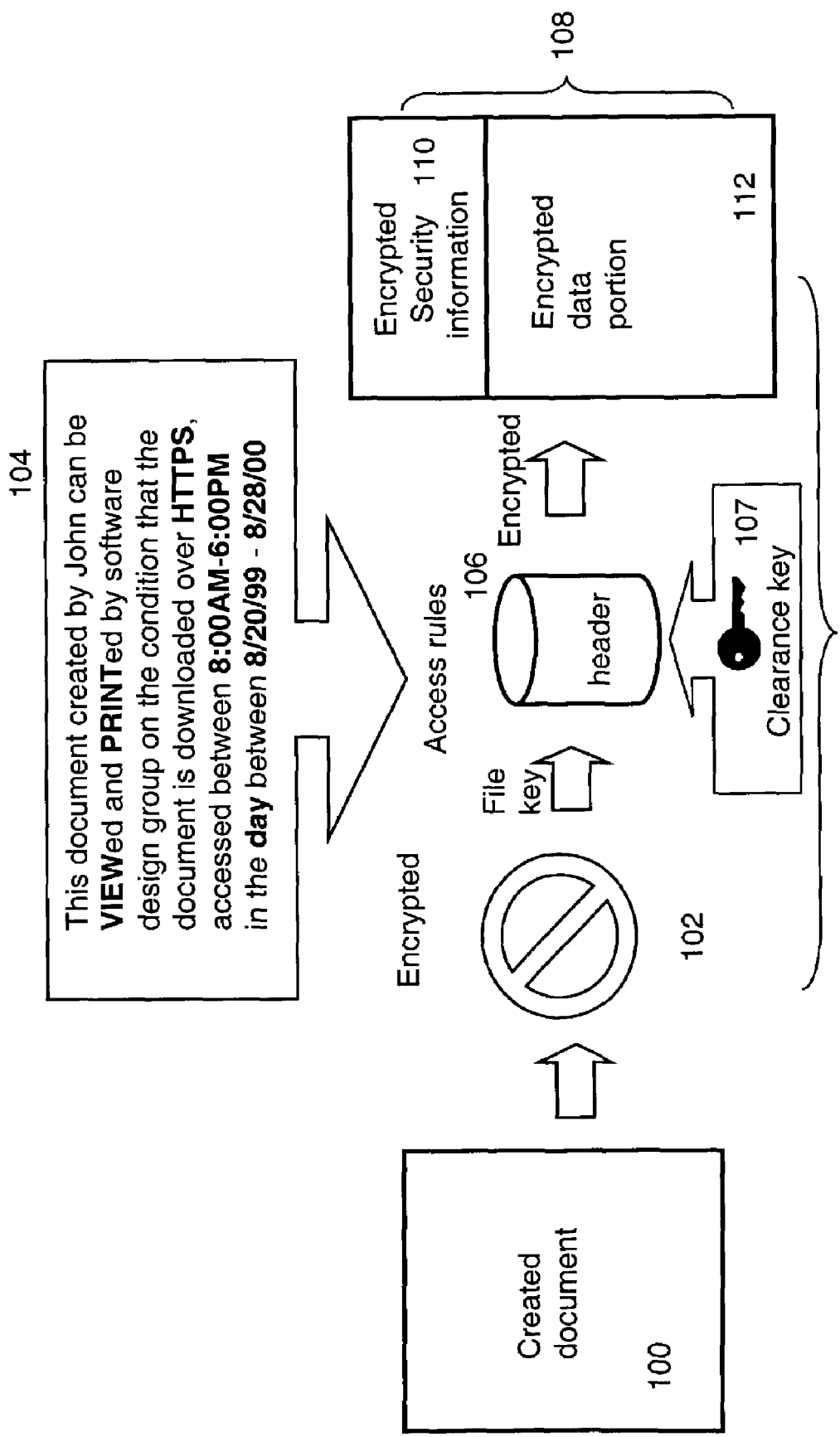
FIG. 1 shows a diagram of securing a created document according to one exemplary secured file form used in the present invention.

The present invention pertains to a process, a system, a method and a software product for securing electronic data or digital assets. According to one aspect of the present invention, secured files may be classified in several hierarchical security levels. To access the secured classified files, in addition to a user key, a user is assigned a clearance key that is based on at least two complementary concepts, "Need to Know" and "Sensitivity Level" of the information in a secured classified file. According to another aspect of the present invention, the digital assets are in a form that includes two parts, one being an encrypted data portion and the other being a header including security information controlling restrictive access to the encrypted data portion. The security information employs access rules together with various cipher keys to ensure that only those with proper access privilege or rights can access the encrypted data portion.

There are numerous advantageous, benefits, and features in the present invention. One of them is the mechanism contemplated herein capable of providing pervasive security to digital assets sought to be protected at all times. Another one is that the digital assets are presented in such a way that only those with proper access privilege as well as sufficient security clearance level can access information in the digital assets. Other advantageous, benefits, and features in the present invention can be readily appreciated by those skilled in the art from the detailed description of the invention provided herein.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1–6. However, those skilled in the art will readily appreciate that the detailed description given herein with respect to these figures is for explanatory purposes as the invention extends beyond these limited embodiments.

Generally, a content created by a creator for the purpose of an entity is an intellectual property belonging to the creator or the entity. In an enterprise, any kind of information or intellectual property can be content, though it is commonly referred to as "information" instead of "content". In either case, content or information is independent of its format, it may be in a printout or an electronic document. As used herein, content or information exists in a type of electronic data that is also referred to as a digital asset. A representation of the electronic data may include, but not be limited to, various types of documents, multimedia files, streaming data, dynamic or static data, executable code, images and texts.

To prevent contents in electronic data from an unauthorized access, the electronic data is typically stored in a form that is as close to impossible as possible to read without a priori knowledge. Its purpose is to ensure privacy by keeping the content hidden from anyone for whom it is not intended, even those who have access to the electronic data. Example of a priori knowledge may include, but not be limited to, a password, a secret phrase, biometric information or one or more keys.

FIG. 1 shows an illustration diagram of securing a created document 100 according to one embodiment of the present invention. One of the purposes of creating a secured file 108 is to ensure that the contents in the document 100 can be only accessed by or revealed to an authorized user with proper access privilege. As used herein, the user may mean a human user, a software agent, a group of users or a member thereof, a device and/or application(s). Besides a human user who needs to access a secured document, a software application or agent sometimes needs to access the secured document in order to proceed forward. Accordingly, unless specifically stated, the "user" as used herein does not necessarily pertain to a human being.

After the document 100 is created, edited or opened with an application or authoring tool (e.g., Microsoft WORD), upon an activation of a command, such as "Save," "Save As" or "Close", or automatic saving invoked by an operating system, the application itself, or an approved application, the created document 100 is caused to undergo a securing process 101. The securing process 101 starts with an encryption process 102, namely the document 100 that has been created or is being written into a store is encrypted by a cipher (e.g., an encryption process) with a file key (i.e., a cipher key). In other words, the encrypted data portion 112 could not be opened without the file key. For the purpose of controlling the access to the contents in the document 100 or the resultant secured file 108, the file key or keys may be the same or different keys for encryption and decryption and are included as part of security information contained in or pointed to by a header 106. The file key or keys, once obtained, can be used to decrypt the encrypted data portion 112 to reveal the contents therein.

To ensure that only authorized users or members of an authorized group can access the secured file 108, a set of access rules 104 for the document 100 is received or created and associated with the header 106. In general, the access rules 104 determine or regulate who and/or how the document 100, once secured, can be accessed. In some cases, the access rules 104 also determine or regulate when or where the document 100 can be accessed. In addition, security clearance information 107 is added to the header 106 if the secured file 108 is classified. In general, the security clearance information 107 is used to determine a level of access privilege or security level of a user who is attempting to access the contents in the secured file 108. For example, a secured file may be classified as "Top secret", "Secret", "Confidential", and "Unclassified".

According to one embodiment, the security clearance information 107 includes another layer of encryption of the file key with another key referred to herein as a clearance key. An authorized user must have a clearance key of proper security level in addition to an authenticated user key and proper access privilege to retrieve the file key. As used herein, a user key or a group key is a cipher key assigned to an authenticated user and may be used to access a secured file or secure a file, or create a secured file. The detail of obtaining such a user key upon a user being authenticated is provided in U.S. patent application Ser. No. 10/074,804.

According to another embodiment, the security clearance information 107 includes a set of special access rules to guard the file key. The retrieval of the file key requires that the user passes an access rule measurement. Since access privilege of a user may be controlled via one or more system parameters (e.g., a policy), the access rule measurement can determine if the user has sufficient access privilege to retrieve the file key in conjunction with the corresponding user key. With the detailed description to follow, those skilled in the art can appreciate that other forms of the security clearance information 107 may be possible. Unless otherwise specified, the following description is based on the security clearance information 107 being another layer of encryption with one or more clearance keys.

In accordance with the security clearance information 107, a user may be assigned a hierarchical security clearance level based on, perhaps, a level of trust assigned to the user. A level of trust implies that one user may be more trusted than another and hence the more trusted user may access more classified files. Depending on implementation, a level of trust may be based on job responsibility of the user or a role of the user in a project or an organization background checks, psychological profiles, or length of service, etc. In any case, a level of trust assigned to the user augments additional aspect to the access privilege of the user such that the user must have proper security clearance to access a classified secured file even if the user is permitted by the access rules to access the file.

As will be further described in detail below, unless the level of security clearance of the user permits, a secured classified file (i.e., the file that is both secured and classified) may not be accessed even if the user has an authenticated user (or group) key and permitted by the access rules in the secured classified file. In one embodiment, the level of security clearance of the user is determined by one or more clearance keys assigned thereto. In general, a clearance key permits a user to access a secured file classified as "top secret", the same clearance key may permit the user to access all secured files classified less secure, such as "secret" or "confidential", where it has been assumed that the user has proper access privilege to be granted by the access rules in the file. In one embodiment, a clearance key is further secured by means of secondary authentication, such as biometric information verification and a second password. In other words, a clearance key may not be automatically released to or activated for a user upon an authenticated login, unless the user provides additional information.

In general, a header is a file structure, preferably small in size, and includes, or perhaps links to, security information about a resultant secured document. Depending on an exact implementation, the security information can be entirely included in a header or pointed to by a pointer that is included in the header. According to one embodiment, the access rules 104, as part of the security information, are included in the header 106. The security information further includes the file key and/or one or more clearance keys, in some cases, an off-line access permit (e.g. in the access rules) should such access be requested by an authorized user. The security information is then encrypted by a cipher (i.e., an en/decryption scheme) with a user key associated with an authorized user to produce encrypted security information 110. The encrypted header 106, if no other information is added thereto, is attached to or integrated with the encrypted data portion 112 to generate the resultant secured file 108. In a preferred embodiment, the header is placed at the beginning of the encrypted document (data portion) to facilitate an early detection of the secured nature of a secured file. One of the advantages of such placement is to enable an access application (i.e., an authoring or viewing tool) to immediately activate a document securing module (to be described where it deems appropriate) to decrypt the header if permitted. Nevertheless, there is no restriction as to where the encrypted header 106 is integrated with the encrypted data portion 112.

It is understood that a cipher may be implemented based on one of many available encryption/decryption schemes. Encryption and decryption generally require the use of some secret information, referred to as a key. For some encryption mechanisms, the same key is used for both encryption and decryption; for other mechanisms, the keys used for encryption and decryption are different. In any case, data can be encrypted with a key according to a predetermined cipher (i.e., encryption/decryption) scheme. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any cipher scheme that is effective and reliable may be used. Hence, the details of a particular scheme are not further discussed herein so as to avoid obscuring aspects of the present invention.

In essence, the secured document 108 includes two parts, the encrypted data portion 112 (i.e., encrypted version of the document itself) and the header 110 that may point to or include security information for the secured document 108.

To access the contents in the encrypted data portion 112, one needs to obtain the file key to decrypt the encrypted data portion 112. To obtain the file key, one needs to be authenticated to get a user or group key and pass an access test in which at least the access rules in the security information are measured against the user's access privilege (i.e., access rights). If the secured file is classified, it further requires a security level clearance on the user. In general, the security clearance level of the user must be high enough before the file key can be retrieved. Alternatively, part of the access rules may be left non-encrypted for users authorized or non-authorized alike to view embedded access permissions of a secured file in a display application or markup language interpreter (e.g., a browser).

Figure 2A:
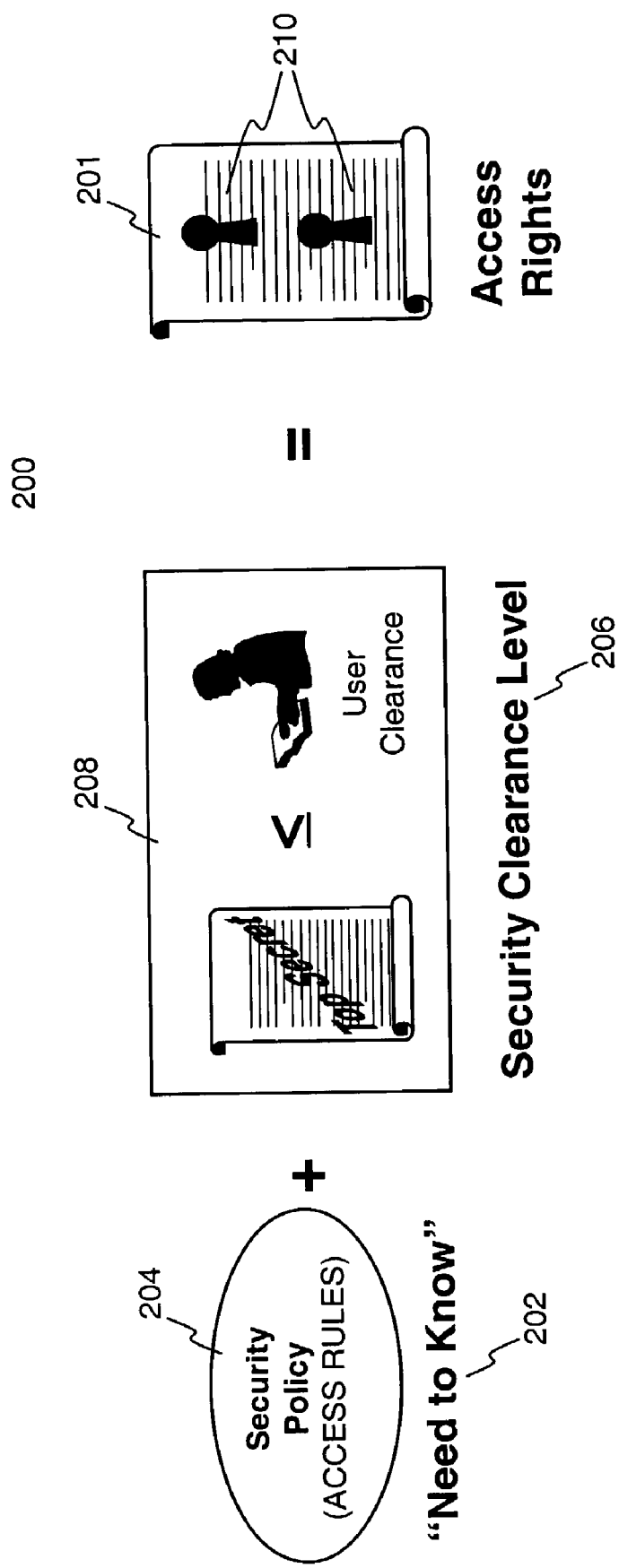
FIG. 2A shows a diagram of what is referred to herein as a two-pronged access scheme according to one embodiment of the present invention.

FIG. 2A shows a diagram 200 of what is referred to herein as a two-pronged access scheme according to one embodiment of the present invention. To access a secured file 201, a user needs to have access privilege based on a condition of "need to know" 202 that is to be measured against by the access rules 204 embedded in the secured file 201. If the secured file 201 is classified, the user must also have a higher security clearance level 206 that is measured against by the security clearance information 206 (e.g., one or more clearance keys. In other words, there are at least two key holes 210 that must be "inserted" with two proper keys before the secured classified file can be accessed.

Figure 2B:
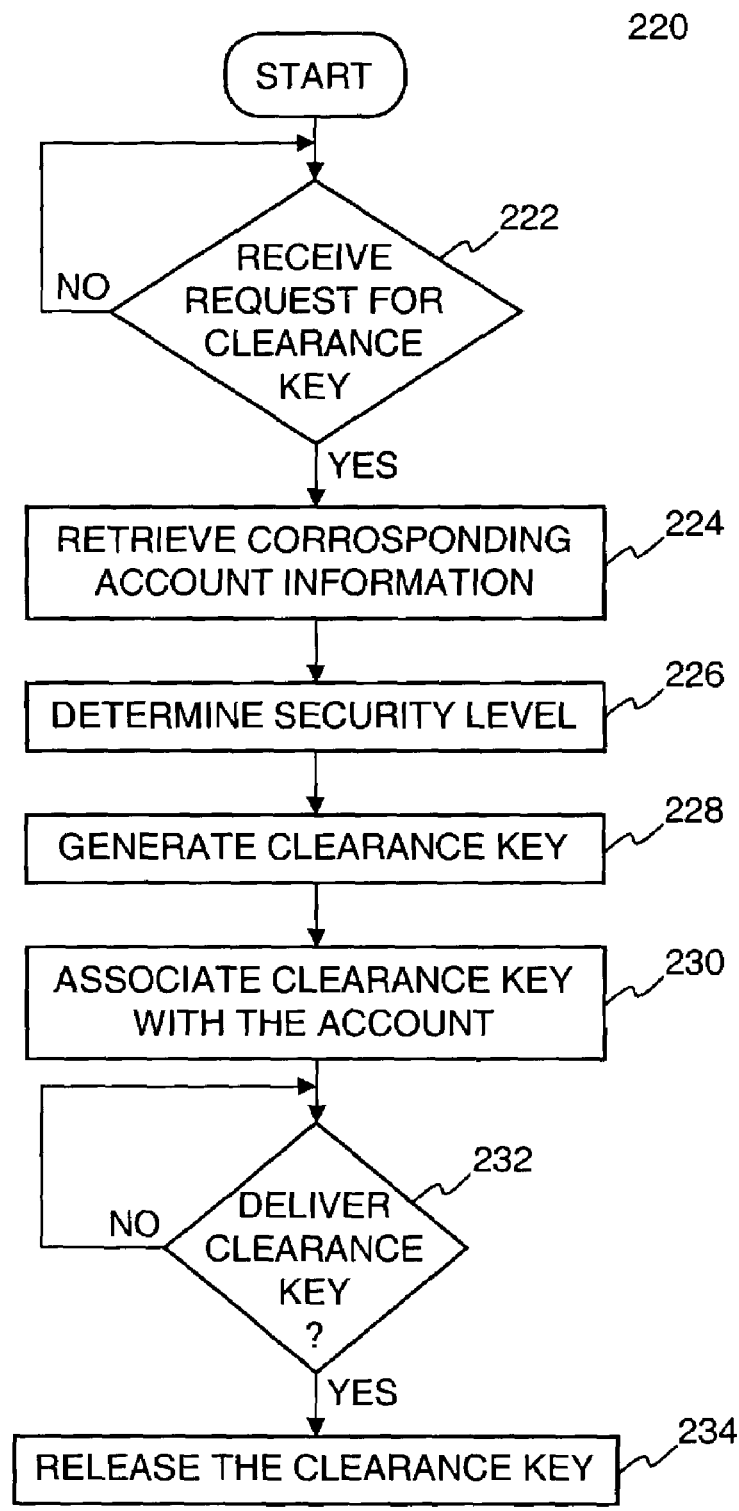
FIG. 2B shows a flowchart of a process for granting a proper security clearance level (i.e., a clearance key) according to one embodiment of the present invention.

FIG. 2B shows a flowchart 220 of process for granting a proper security clearance level (i.e., a clearance key) according to one embodiment of the present invention. The process 220 can be initiated with a request for a clearance key. Depending on implementation, the process 220 may be implemented in a machine (e.g., a central server, a local server or a client machine) that provides access control management to all secured files, perhaps, in an inter/intra enterprise environment, or a combination of a local client machine used by users and the machine.

At 222, the process 220 awaits a request for a clearance key. It is described that a secured file can be classified or unclassified. When it is determined that a user needs to access a secured file that is classified, such request is provided to activate the process 220. In general, the request pertains to a specific user or some members in a group. At 224, a corresponding account for the user is retrieved, provided there is the account for the user. If the account is not available, then the account shall be opened accordingly. Alternatively, the process 220 may be part of the process of opening an appropriate account for a user who has the need-to-know basis to access secured files at certain security or confidential level(s). Depending on implementation, the corresponding account information may include a username or identifier, membership information, designated access privilege, and a corresponding user key (which sometimes is a pair of a private key and a public key). At 226, a security level for the user is determined, which is usually done by the necessity. For example, an executive of an enterprise may be assigned the highest security clearance level and a front desk receptionist may be assigned the lowest security clearance level. Once the security level is determined, a clearance key is generated at 228.

Figure 2C:
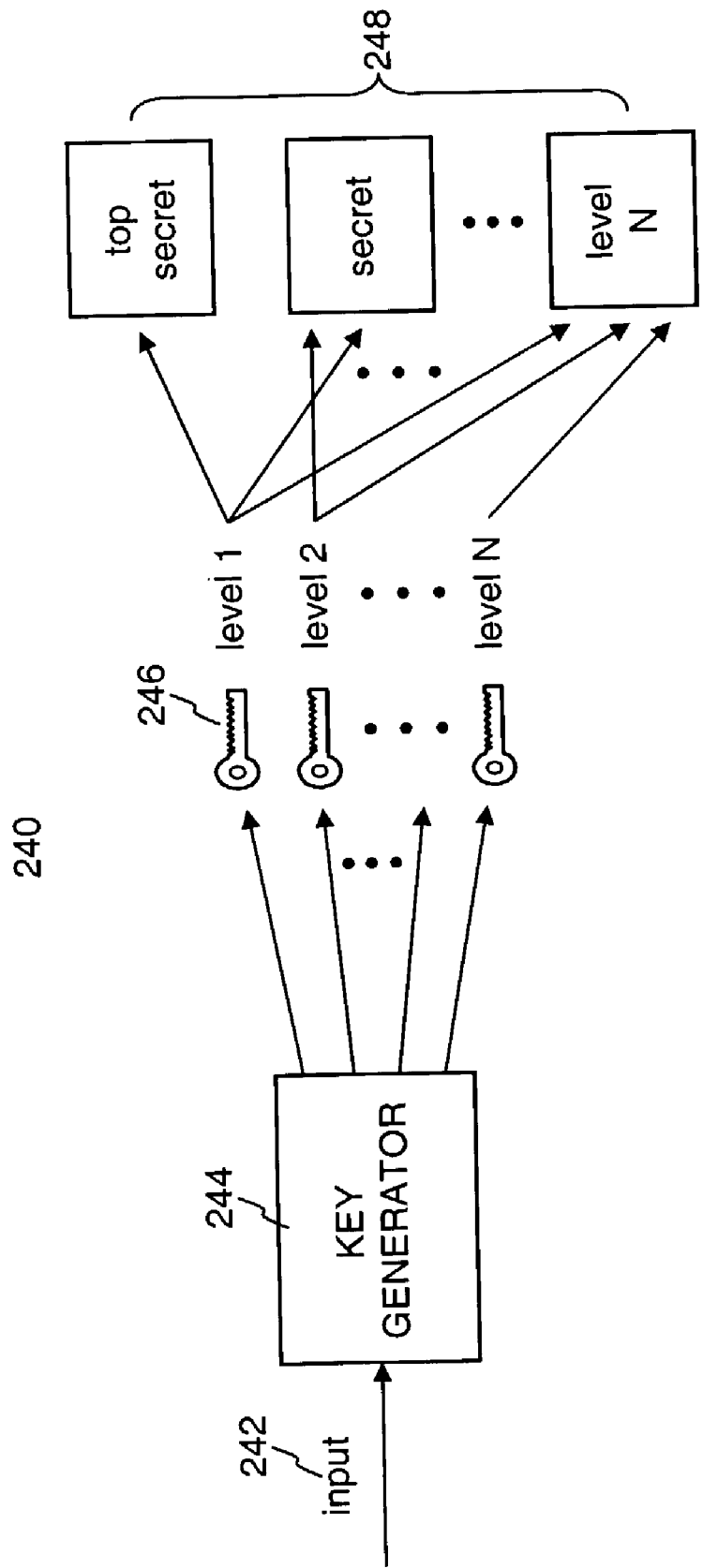
FIG. 2C shows a diagram of generating a clearance key according to one embodiment of the present invention.

Referring now to FIG. 2C, there is shown a diagram 240 of generating a clearance key according to one embodiment of the present invention. A key generator 244 receives one or more parameters 242 controlling the security level determined at 226 of FIG. 2B to generate a sequence of alpha-numeric or binary numbers as a key. Whether using a secret-key cryptosystem or a public-key cryptosystem, one needs a good source of random numbers for key generation.

The main features of a good source are that it produces numbers that are unknown and unpredictable by potential adversaries. There are many ways to generate such numbers, for example, random numbers can be obtained from a physical process. Another approach is to use a pseudo-random number generator fed by a random seed. In any case, depending on the input 242, the generator 244 is configured to generate a clearance key of proper security level. In one embodiment, the key generator 244 generates keys 246 of different lengths or forms, each of the keys 246 corresponds to a security level, such as level 1 (highest security), level 2, . . . , level N (lowest security). In another embodiment, each of the keys 246 generated by the key generator 244 is embedded with a signature signifying a security level. Other methods of specifying a security level of a clearance key are possible. Although it is possible to implement in such a way that each clearance key with a certain security level can only access secured files classified in the same security level, it is preferable to permit a clearance key with a higher security level to access secured files classified in the lower security levels. In other words, a clearance key in level 1 (i.e., the highest security level primarily designated to secured files classified as "top secret") can be used to access all secured classified files 248, while a clearance key in level 2 can be used to access all secured classified files 248 except for those classified as "top secret". Likewise, a clearance key in level N can be only used to access secured files in security level N. One of the advantages for such arrangement is that a user needs only to have one clearance key, if the user has the need to access those secured classified files.

FIG. 2D shows a diagram of generating a clearance key according to another embodiment of the present invention. The key generator 244 receives one or more parameters 242 controlling the security level determined at 226 of FIG. 2B to generate a number of sets of alphanumeric or binary numbers as a primary key 246 and auxiliary keys 247. The primary key 246 is the one being requested, generated in accordance with the determined security level and can be used to facilitate the access to a secured file classified at a security or confidentiality level. The auxiliary keys 247 are those keys generated to facilitate the access to secured files classified less than the security or confidentiality level. As shown in the figure, it is assumed that the primary key 246 is for accessing a secured file classified at level 2. Accordingly, the auxiliary keys 247 can be respectively used to access secured files classified level 3, level 4, . . . to level N, all less than level 2 in terms of security or confidentiality. To facilitate the description of the present invention, the following description is based on FIG. 2C and can be readily applied to FIG. 2D.

Returning to FIG. 2B, after a proper clearance key is generated at 228, the clearance key is associated with the account at 230 so that the user will use the correct key to access a secured file that requires a clearance key. The process 220 now awaits any call for the clearance key at 232. Depending on implementation, the clearance key may be stored locally or remotely and retrievlable only when there is a need for it to access a classified secured file. In some cases, the clearance key can only be retrievlable when a user passes a secondary authentication means. For example, a user is entitled to access certain secured files classified at least at a security level. The clearance key associated with the user may be configured to be protected by means of secondary authentication, such as biometric information verification or a second password, to increase security level of the clearance key. When a non-secured classified file is accessed, the clearance key is not needed and therefore will not be released to or activated for the user. When a secured classified file is accessed, the process 220 goes to 234, wherein the clearance key is released to the user to facilitate the retrieval of the file key in the secured file, provided the user has furnished necessary information or passed secondary authentication if needed.

FIG. 3A illustrates an exemplary structure of a secured file 300 including a header 302 and an encrypted data portion 304. Depending on implementation, the header 302 may or may not include a flag or signature 306. In one case, the signature 306 is used to facilitate the detection of the security nature of a secured file among other files. The header 302 includes a file key block 308, a key block 310 and a rule block 312. The file key block 308 includes a file key 309 that is encrypted by a cipher with a protection key 320 (i.e., a doc-key key sometimes) and further with the clearance key 322 associated with a user who attempts to access the secured file 300. Alternatively, the file 309 is encrypted with the clearance key 322 and then the protection key 320. The protection key 320 is encrypted and stored in the key block 310. In general, the key block 310 has an encrypted version of the protection key 320 and can be only accessible by designated user(s) or group(s). There may be more than one key blocks in a header, wherein three key blocks are shown in FIG. 3A. To recover or retrieve the protection key 320, a designated user must have proper access privilege to pass an access rule test with the embedded access rules in the rule block 312.

All access rules are encrypted with a user key (e.g., a public user key) and stored in the rule block 312. A user attempting to access the secured file uses must have a proper user key (e.g., a private user key) to decrypt the access rules in the rule block 312. The access rules are then applied to measure the access privilege of the user. If the user is permitted to access the secured file in view of the access rules, the protection key 320 in the key block 310 is retrieved to retrieve the file key 309 so as to access the encrypted data portion 304. However, when it is detected that the secured file is classified, which means that the file key can not be retrieved with only the protection key, the user must posses a clearance key. Only does the user have the clearance key, together with the retrieved protection key 320, the file key 309 may be retrieved to proceed with the decryption of the encrypted data portion 304.

According to one embodiment, the encrypted data portion 304 is produced by encrypting a file that is non-secured. For example, a non-secured document can be created by an authoring tool (e.g., Microsoft Word). The non-secured document is encrypted by a cipher with the file key. The encryption information and the file key are then stored in the security information.

According to another embodiment, the non-secured document (data) is encrypted using the following aspects, a strong encryption using a CBC mode, a fast random access to the encrypted data, and an integrity check. To this end, the data is encrypted in blocks. The size of each block may be a predetermined number or specific to the document. For example, the predetermined number may be a multiple of an actual encryption block size used in an encryption scheme. One of the examples is a block cipher (i.e., a type of symmetric-key encryption algorithm that transforms a fixed-length block of plaintext (unencrypted text) data into a block of ciphertext (encrypted text) data of the same length. This transformation takes place under the action of a cipher key (i.e., a file key). Decryption is performed by applying the reverse transformation to the ciphertext block using another cipher key or the same cipher key used for encryption. The fixed length is called the block size, such as 64 bits or 128. Each block is encrypted using a CBC mode. A unique initiation vector (IV) is generated for each block.

Other encryption of the non-secured data can be designed in view of the description herein. In any case, the encryption information and the file key are then stored in the security information. One of the important features in the present invention is that the integration of a header and the encrypted data portion will not alter the original meaning of the data that is otherwise not secured. In other words, a designated application may still be activated when a secured file is selected or "clicked". For example, a document "xyz.doc", when selected, will activate an authoring tool, Microsoft Word, commonly seen in a client machine. After the document "xyz.doc" is secured in accordance with the present invention, the resultant secured file is made to appear the same, "xyz.doc" that still can activate the same authorizing tool, except now the secured file must go through a process to verify that a user is authenticated, the user has the proper access privilege and sufficient security clearance.

Another one of the important features in the present invention is the use of the protection key. With the protection key, the file key can be updated without having to modify the key-blocks. For example, the file key in the file key block 308 can be updated without having to modify the key-blocks. This feature helps improve security of the secured files and make file copy operations work faster.

FIG. 3B shows an exemplary header structure 350 of a secured file according to one embodiment of the present invention. In general, a header of a secured file is a point of entry to the secured file. The header structure 350 includes various security information to ensure that only an authorized user with sufficient access privilege can access the encrypted data in the secured file. The security information is cryptographically protected or secured. In one embodiment, a good part of the header or the security information therein is protected by a Message Authentication Code (MAC) that can detect any tempering with the header by an unauthorized user without a valid decryption key or CRC 316 of FIG. 3A.

The header structure 350 is preferably structured in a descriptive language such as a markup language. Examples of such a markup language include HTML, WML, and SGML. In a preferred embodiment, the markup language is Extensible Access Control Markup Language (XACML) that is essentially an XML specification for expressing policies for information access. In general, XACML can address fine grained control of authorized activities, the effect of characteristics of the access requester, the protocol over which the request is made, authorization based on classes of activities, and content introspection (i.e., authorization based on both the requestor and attribute values within the target where the values of the attributes may not be known to the policy writer). In addition, XACML can suggest a policy authorization model to guide implementers of the authorization mechanism.

One portion in the header structure 350 is referred to as a key block list 352 that may contain one or more key blocks. A key block 354 contains an encrypted protection key that is sometimes referred to as document/file-encryption-key key, namely a key to the file key. To ensure that the protection key is indeed protected, it is encrypted and can only be retrieved by a designated entity. For example, a secured file is created by a member of engineering group and permitted for full access by every member in the engineering group. The same secured file meanwhile is also permitted for limited access (e.g., only read and print) by every member in the marketing group. Accordingly, the key block list 352 may include two key blocks, one for the engineering group and the other for the marketing group. In other words, each of the two key blocks has an encrypted protection key that can be only accessed by a member of the corresponding group (via a group or individual private key).

The key block version value 356 provides necessary details of the encryption algorithm used to protect the protection key 340. In one embodiment, the RSA-OAEP (RSA—Optimal Asymmetric Encryption Padding) which is a public-key encryption scheme combining the RSA algorithm with the OAEP method is used. In particular, the uuid of the key pair 358 identifies a certificate and a private key (the details thereof are not shown) that are used to decrypt this value. In addition, attributes of the key pair, such as whether the key is 1024 or 2048 bits long, are also included to facilitate the protection of the protection key 340.

The block 342 of the header structure 350 includes at least three segments 344, 346 and 348. The segment 344 includes an encrypted file key that must be retrieved in clear to decrypt the encrypted data portion. The segment 346 includes security level information to indicate what security level the secured file is at, for example, "top secret", "secret", "confidential" or "unclassified" or "none". The segment 348 includes information about the size of the encryption block for the encrypted data portion in the secured file. According to one embodiment, this is a multiple of the algorithm encryption block size. The encrypted data portion is created by an encryption with a symmetric key that is called the document/file-encryption-key or file key herein.

There is another portion 360 of the header structure 350 that is encrypted by a user or group key. The portion 360 (the details thereof are not shown) contains essentially the access rules embedded with the secured file to govern who/where the secured file can be accessed. Various conditions of accessing the file can be placed or realized in the access rules. Additional details of the access rules can be references U.S. patent application Ser. No. 10/074,804.

The above description is based on one embodiment in which the access rules are encrypted with a user's public key. Those skilled in the art can appreciate that the access rules may be also encrypted with a file encryption key (i.e., the file key) or the protection key. In this case, the protection key is encrypted with a user's public key or together with a clearance key associated with the user if a subject secured file is secured. Now instead of retrieving the protection key after the access rules are successfully measured against access privilege of the user attempting to access a secured file, the protection key is retrieved first with a user's private key. The protection key can be used to retrieve the access rules that are subsequently used to measure against the access privilege of the user if the protection key was used to encrypt the access rules. If the user is permitted to access the contents in the file, the file key is then retrieved with the protection key (or together with the clearance key). Alternatively, right after the protection key is retrieved, the protection key (or together with the clearance key) is used to retrieve the file key. The file key is then to retrieve the access rules that are subsequently used to measure against the access privilege of the user. In any case, if the user is determined that the user has sufficient access privilege in view of all access policies, if there are any, the retrieved file key can be used to continue the description of the encrypted data portion.

FIG. 4 there is shown a flowchart of process 400 for accessing a secured document according to one embodiment of the present invention and may be understood in conjunction with FIG. 3A or FIG. 3B. The process 400 may be implemented in an executable module (e.g., document securing module) that can be activated when a user intends to access a secured document. For example, a user is using a client machine running a Microsoft Windows operating system to access a secured document stored in a folder, a local, or remote store. By activating a Window Explorer or Internet Explorer, the user may display a list of files, some are non-secured and others are secured. Among the secured files, some of them are classified and secured in the manner in accordance with FIG. 3A. Within the display of the list of files, a desired one can be selected. Alternatively, a desired file may be selected from an application, for example, using "open" command under File of Microsoft Word application.

In any case, at 402, such desired document is identified to be accessed. Before proceeding with the selected document, the process 400 needs to determine whether the selected file is secured or non-secured. At 404, the selected document is examined. In general, there are at least two ways to examine the secure nature of the selected document. A first possible way is to look for a flag or signature at the beginning of the document. As described above, in some secured documents, a flag, such as a set of predetermined data, is placed in the header of a secured document to indicate that the document being accessed is secured. If no such flag is found, the process 400 goes to 420, namely, the selected documented is assumed non-secured and thus allowed to pass and load to a selected application or place desired by the user. A second possible way is to look for a header in a selected document. Being a secured document, there is a header attached to an encrypted data portion. The data format of the header shall be irregular in comparison with the selected document if it is non-secured. If it is determined that the selected document has no irregular data format as required by a selected application, the process 400 goes to 420, namely, the selected document is assumed to be non-secured and thus allowed to pass and load to a selected application or place desired by the user.

Now if it is determined at 404 that the selected document is indeed secured, the process 400 goes to 406, wherein the user and/or the client machine being used by the user are checked to determine if the user and/or the client machine are authenticated. The details of the user authenticating himself/herself/itself may be provided in U.S. patent application No. 10/074,804. In the case that the user and/or the client machine are not authenticated, the process 400 goes to 418 that may display an appropriate error message to the user. It is now assumed that the user and/or the client machine are authenticated, the header or security information therein is decrypted with the authenticated user key.

At 408, the access rules in the decrypted security information are retrieved. As described above, there may be sets of access rules, each set designated for a particular user or members of a particular group. With the authenticated user key and/or a corresponding user identifier, a corresponding set of access rules is retrieved. At 410, the retrieved access rules are compared to (or measured against) the access privileges associated with the user. If the measurement fails, which means that the user is not permitted to access this particular document, a notification or alert message may be generated to be displayed to the user at 418. If the measurement passes successfully, which means that the user is permitted to access this particular document, the process 400 moves on to decrypt and retrieve the protection key at 411 and then determine if the secured document is classified at 412. When it is determined that the secured document is not classified or there is no security clearance requirement in the security information, the process 400 goes to 416, wherein a file key is retrieved and, subsequently, used to decrypt the encrypted data portion in the selected (secured) document. When it is determined that the secured document is classified, the process 400 goes to 414 that checks if the authenticated user possesses a clearance key matching the security clearance requirement. In general, the security level of the clearance key must be equal to or higher than the security clearance requirement in the secured classified document. If the security level of the clearance key is not sufficient enough, the process 400 goes to 418 that can be configured to display an appropriate error message to the user. If the security level of the clearance key is sufficient enough, the process 400 goes to 416.

In any case, a file key is retrieved with the protection key alone if the secured document is not classified or the protection key together with the clearance key if the secured document is classified. As a result, the decrypted document or clear contents of the selected document is provided at 420.

FIG. 5 shows a flowchart of a process 500 for securing a file or document being created according to one embodiment of the present invention. The process 500 may be understood in conjunction with a client machine running a Microsoft Windows operating system. However, it is clear to those skilled in the art that the description herein or the invention does not imply such limitations.

At 502, a blank document is opened or created by an authoring application chosen and activated by a user. The authoring application may be Microsoft Word, Microsoft PowerPoint or WordPerfect. In a preferred procedure, the user may save the document into a folder or a protected store that has already setup with a set of access rules. If not, one or more sets of access rules may be created. Optionally, the access rules may be received by importation of a previously created file including desirable access rules, defaults of the user access privileges or individually created user access privileges. At 504, the set of predetermined access rules is received, preferably, in a descriptive language such as a plain test or a markup language (e.g., XACML).

At 506, a secret cipher key (i.e., a file key) is generated from a cipher module for the document and typically stored in a temp file that is generally not accessible by an ordinary user. The temp file will be erased automatically when the secured document is done (e.g., at a "Close" command from the application). At 508, the document is checked to see if a request to write the document into a local store is made. If such request is detected (which could be made manually by the user or periodically by the authoring tool or an OS procedure), the document is encrypted with the file key at 510. One of the features in the present invention is that the stored document is always encrypted in storage even if it is still being processed (e.g., authored, edited or revised). When the user is done with the document, a "Close" request is activated to close the document. At 512, such a request is detected. As soon as such request is received, it means that a secured version of the document needs to be written into the store. At 514, it is assumed that the document is classified and that that user who is working with the document has been previously assigned a clearance key. The generated file key is then encrypted with a protection/clearance key and further with a clearance/protection key. The protection key may be generated from a cipher module. At 516, the protection key is encrypted with the authenticated user key.

To protect the encrypted protection key, at 518, appropriate access rules are applied and inserted along with the encrypted protection key in the security information that may be further encrypted with the authenticated user key. The encrypted version of the security information is then packed in the header. Depending on implementation, a flag or signature can be further included in the header. Alternatively, the header could include the security information without a flag. At 520, the header is attached to or integrated with the encrypted document from 510 and subsequently the secured document is placed into the store at 524.

As described above, the secured document includes two encrypted portions, the header with encrypted security information and the encrypted data portion (i.e., the encrypted document). The two parts in the secured documents are encrypted respectively with two different keys, the file key and the user key. Alternatively, the two encrypted portions may be encrypted again with another key (or use the same user key) at 522.

In the case that there are a number of sets of access rules, each for a particular user or a group of users, it can be understood that the encrypted access rules at 518 are integrated with other sets of the encrypted access rules in a rules block as illustrated in FIG. 3A. As such, an access from one user or group will not affect other users or groups but the other users or groups will see perhaps an updated version of the encrypted document.

Figure 6:
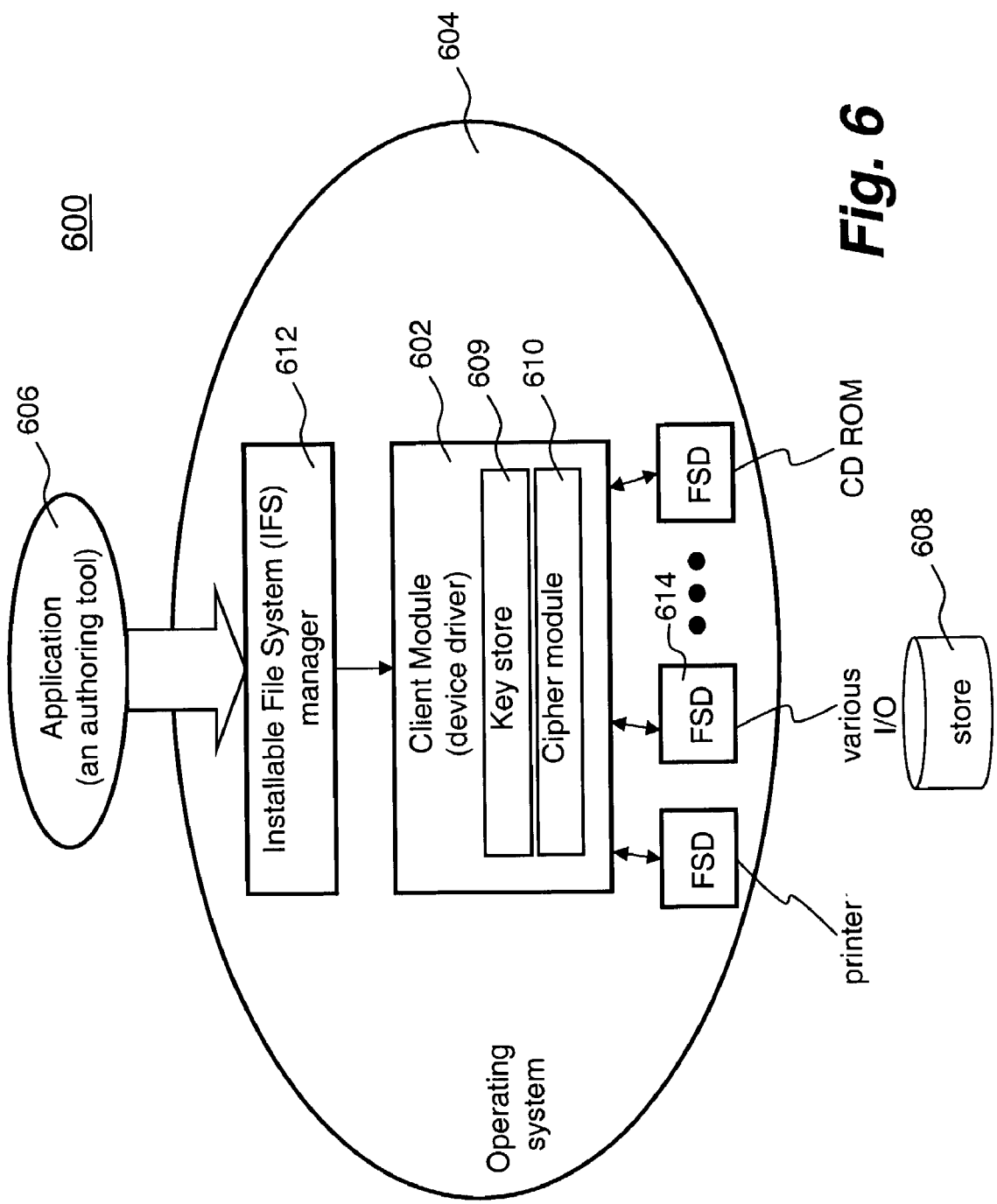
FIG. 6 shows an exemplary implementation of the present invention.

FIG. 6 shows an exemplary implementation 600 of the present invention. A client machine used by a user to access a secured file or secure a created file executes an operating system (e.g., WINDOWS 2000/NT/XP) and may be viewed to have two working modes, one being the user mode and the other being the OS mode. A client module 602 representing an executable version of the present invention is configured to interact with and operate within an operating system 604 to ensure that a document is made secured and a secured document can be accessed only by an authorized user. One of the features of the client module 604 is that the operations thereof are transparent to the user. In other words, the user is not made aware of the operations of the client module 604 when accessing a secured document or securing a document.

An application 606 (e.g. a registered application, such as Microsoft Word) operates in the user mode or the OS 604 and may be activated to access a document stored in a store 608. The store 608 may be a local storage place (e.g., hard disk) or remotely located (e.g., another device). Depending on the security nature (secured vs. non-secured) of the document being accessed, the client module 602 may activate a key store 609 (or an interface thereto) and a cipher module 610. The key store 609 retains an authenticated user key after the user is authenticated. If the user has the need to access some secured classified files, the key store 609 may retain a corresponding clearance key. Depending on implementation, the key store 609 may be configured to retrieve a clearance key from another location or activate a clearance key from an encrypted version thereof. The cipher module 610 implements one or more en/decryption schemes and is, preferably, modular so that a different cipher module implementing alternative en/decryption schemes may be readily used, if desired.

According to one embodiment, the client module 202 is analogous in many ways to a device driver that essentially converts more general input/output instructions of an operating system to messages that a device/module being supported can understand. Depending on the OS in which the present invention is implemented, the client module 602 may be implemented as a VxD (virtual device driver), a kernel or other applicable format.

In operation, the user selects a document that is associated with an application 606 (e.g., MS WORD, PowerPoint, or printing). The application 606 acts on the document and calls an API (e.g., createFile, a Common Dialog File Open Dialog with Win32 API in MS Windows) to access the installable file system (IFS) manger 612. If it is detected that an "Open" request is made from the application 206, the request is passed to an appropriate file system driver (FSD) 614 to access the requested document. When it is detected that the requested document is secured, the key store 209 and the cipher module 610 are activated and an authenticated user (private) key is retrieved. The encrypted security information in the header of the requested secure document is decrypted with the user key. Now the access rules in the secured document are available, a rules measurement is carried out in the client module 602 to determine if the user is permitted to access the selected secured document. If the measurement is successful, that means the user is permitted to access the secured document, a file key is retrieved from the security information with a retrieved protection key as well as the clearance key and, subsequently, the cipher module 610 proceeds to decrypt the encrypted document (i.e., the encrypted data portion) in the client module 602. The clear contents are then returned to the application 606 through the IFS manager 612. For example, if the application 606 is an authoring tool, the clear contents are displayed. If the application 606 is a printing tool, the clear contents are sent to a designated printer.

In another embodiment, an operating system (OS) access, known as the ProcessID property, can be used to activate an application (as an argument to the AppActivate method). The parameter ProcessID identifies the application and an event handler thereof takes necessary parameters to continue the OS access to the Installable File System (IFS) Manager 612 that is responsible for arbitrating access to different file system components. In particular, the IFS Manager 612 acts as an entry point to perform various operations such as opening, closing, reading, writing files and etc. With one or more flags or parameters passed along, the access activates the client module 602. If the document being accessed by the application is regular (non-secured), the document will be fetched from one of the File System Driver (FSD) (e.g., FSD 614) and passed through the client module 602 and subsequently loaded into the application through the IFS Manager 612. On the other hand, if the document being accessed by the application is secured, the client module 602 activates the the key store 609 and the cipher module 610 and proceeds to obtain an authenticated user key to retrieve the access rules therein. Pending the outcome from the access test module 609, a file key may be retrieved to decrypt the encrypted data portion of the secured document by the cipher in the cipher module 610. As a result, the data portion or the document in clear mode will be loaded into the application through the IFS Manager 612.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. In a system for providing restrictive access to electronic data, wherein the electronic data is structured in a format that controls access to contents in the electronic data, a method for securing the electronic data in the format, the method comprising:
   generating an encrypted data portion by encrypting the electronic data with a first key according to a predetermined cipher scheme;
   encrypting the first key with a second key, if the electronic data is not classified;
   encrypting the first key with the second key together with a clearance key, if the electronic data is classified;
   encrypting the second key to produce an encrypted version of the second key;
   applying access rules to protect the encrypted version of the second key; and
   integrating a header with the encrypted data portion to produce a secured file, wherein the header includes the encrypted first key, the encrypted second key and the access rules.

2. The method of claim 1, wherein the access rules can be decrypted only with an authenticated user key associated with the user attempting to access the contents of the electronic data.

3. The method of claim 1, wherein the generating of the encrypted data portion comprises:
   determining a block size of blocks that are used to divide, respectively, the electronic data; and
   encrypting each of the blocks according to the predetermined cipher scheme.

4. The method of claim 1, wherein the encrypting of the first key with the second key together with the clearance key, if the electronic data is classified, comprises:
   encrypting the first key with the clearance key to produce an initial encrypted version of the first key; and
   encrypting the initial encrypted version of the first key with the second key to produce the encrypted version of the first key.

5. The method of claim 1, wherein the clearance key corresponds to a confidential level that determines what classified secured files the clearance key can be used to retrieve the first key.

6. The method of claim 5, wherein the confidential level ranges from most classified to non-classified.

7. The method of claim 5, wherein the clearance key can be used together with the second key, if the access rules have been measured successfully against access privilege of a user attempting to access the contents in the electronic data, to retrieve the first key in the secured file classified at or lower than the confidential level of the clearance key.

8. The method of claim 1, wherein the access rules are expressed in a descriptive language.

9. The method of claim 8, wherein the descriptive language is a markup language.

10. The method of claim 9, wherein the markup language is one of (i) SGML, (ii) HTML, (iii) WML, and (iv) XACML.

11. The method of claim 1, wherein the encrypting of the second key to produce the encrypted version of the second key comprises:
   obtaining a public user key associated with a user attempting to secure the electronic data; and
   encrypting the second key using the public user key according to the predetermine cipher scheme.

12. The method of claim 1, wherein the encrypted version of the second key can be decrypted with a private user key associated with the user, provides that the private user key has been authenticated.

13. In a system for providing restrictive access to electronic data, wherein the electronic data is structured in a format that controls access to contents in the electronic data, a method for accessing the electronic data, the method comprising:
   obtaining an authenticated user key associated with a user attempting to access the electronic data;
   retrieving access rules embedded in the format to determine if the user has proper access privilege;
   retrieving a second key if the user is permitted to access the electronic data;
   if the contents in the electronic data are classified;
      obtaining a clearance key associated with the user;
      using the second key and the clearance key to ultimately retrieve a first key;
   if the contents in the electronic data are not classified;
      using the second key to retrieve the first key; and
   decrypting, using the first key, an encryption data portion representing an encrypted version of the electronic data.

14. The method of claim 13, wherein the access rules are also encrypted.

15. The method of claim 14, wherein the retrieving of the access rules embedded in the format to determine if the user has proper access privilege comprises:
   decrypting the access rules with the authenticated user key; and
   testing if access privilege of the user is within the access rules.

16. The method of claim 13, wherein the access rules are expressed in a descriptive language and control who or how the electronic data can be accessed.

17. The method of claim 13, wherein the retrieving of the second key, if the user is permitted to access the electronic data, comprises decrypting the second key that is encrypted with the authenticated user key after it is determined that the user is permitted to access the electronic data.

18. The method of claim 13, wherein the using of the second key and the clearance key to ultimately retrieve the first key comprises obtaining the first key by sequentially using the second key and the clearance key to decrypt an encrypted version of the first key.

19. The method of claim 13, wherein the using of the second key and the clearance key to ultimately retrieve the first key comprises obtaining the first key by sequentially using the clearance key and the second key to decrypt an encrypted version of the first key.

20. The method of claim 13, wherein the method is executed in a client machine from which the user attempts to access the electronic data.

21. A machine readable medium having embodied thereon a program, the program being executable by a machine to perform a method for providing restrictive access to electronic data, wherein the electronic data is structured in a format that controls access to contents in the electronic data, the method comprising:
   generating an encrypted data portion by encrypting the electronic data with a first key according to a predetermined cipher scheme;
   encrypting the first key with a second key, if the electronic data is not classified;
   encrypting the first key with the second key together with a clearance key, if the electronic data is classified;

encrypting the second key to produce an encrypted version of the second key;

applying access rules to protect the encrypted version of the second key; and integrating a header with the encrypted data portion to produce a secured file, wherein the header includes the encrypted first key, the encrypted second key and the access rules.

22. A machine readable medium having embodied thereon a program, the program being executable by a machine to perform a method for providing restrictive access to electronic data, wherein the electronic data is structured in a format that controls access to contents in the electronic data, the method comprising:

obtaining an authenticated user key associated with a user attempting to access the electronic data;

retrieving access rules embedded in the format to determine if the user has proper access privilege;

retrieving a second key if the user is permitted to access the electronic data;

if the contents in the electronic data are classified;
obtaining a clearance key associated with the user;
using the second key and the clearance key to ultimately retrieve a first key;

if the contents in the electronic data are not classified;
using the second key to retrieve a first key; and
decrypting, using the first key, an encryption data portion representing an encrypted version of the electronic data.

23. The method of claim 1, wherein the encrypting of the first key with the second key together with the clearance key, if the electronic data is classified, comprises:

encrypting the first key with the second key to produce an initial encrypted version of the first key; and encrypting the initial encrypted version of the first key with the clearance key to produce the encrypted version of the first key.

* * * * *